United States Patent

Hamrock et al.

[11] Patent Number: 6,063,522
[45] Date of Patent: May 16, 2000

[54] ELECTROLYTES CONTAINING MIXED FLUOROCHEMICAL/HYDROCARBON IMIDE AND METHIDE SALTS

[75] Inventors: Steven J. Hamrock, St. Paul; Phat T. Pham, Little Canada, both of Minn.

[73] Assignee: 3M Innovative Properties Company, St. Paul, Minn.

[21] Appl. No.: 09/047,039

[22] Filed: Mar. 24, 1998

[51] Int. Cl.[7] .................. H01M 10/40; H01M 6/04
[52] U.S. Cl. .................. 429/200; 429/300; 429/303; 429/307; 429/324
[58] Field of Search .................. 429/200, 300, 429/303, 307, 309, 314, 324, 347

[56] References Cited

U.S. PATENT DOCUMENTS

| | | | |
|---|---|---|---|
| 3,793,079 | 2/1974 | Brown et al. | 429/347 X |
| 4,505,997 | 3/1985 | Armand et al. | |
| 4,851,307 | 7/1989 | Armand et al. | |
| 5,072,040 | 12/1991 | Armand | 564/82 |
| 5,273,840 | 12/1993 | Dominey | |
| 5,414,117 | 5/1995 | Armand et al. | 562/828 |
| 5,446,134 | 8/1995 | Armand et al. | 534/558 |
| 5,502,251 | 3/1996 | Pohmer et al. | 564/82 |
| 5,514,493 | 5/1996 | Waddell et al. | 429/300 X |
| 5,654,112 | 8/1997 | Itou et al. | 429/314 |
| 5,691,081 | 11/1997 | Krause et al. | 429/307 |

FOREIGN PATENT DOCUMENTS

| | | |
|---|---|---|
| 0 779 671 A2 | 6/1997 | European Pat. Off. . |
| 850920 | 7/1998 | European Pat. Off. . |
| 850921 | 7/1998 | European Pat. Off. . |
| WO 95/26056 | 9/1995 | WIPO . |

OTHER PUBLICATIONS

Synthesis and electrochemical characterization of a new family of lithium salts, D. Benrabah et al., Solid State Ionics 60 (1993) 87–92. (Month unknown).

Synthesis and Properties of LiC $(SO_2CF_3)_3$ and Related New Li Salts in Polymer Electrolytes and Tetrahydrofuran, Larry A. Dominey, pp. 416–421. (Date unknown).

Synthesis and Characterization of New Organic Lithium Salts, X.Q. Yang et al., Abstract No. 65, p. 73. (May 1997).

*Primary Examiner*—Stephen Kalafut
*Attorney, Agent, or Firm*—Daniel C. Schulte

[57] ABSTRACT

Battery electrolytes are described which include particular imide and methide conductive salts having mixed fluorocarbon and hydrocarbon groups. These salts exhibit excellent conductivity in electrolytes and are described as useful in electrochemical cells, such as lithium batteries.

32 Claims, No Drawings

ELECTROLYTES CONTAINING MIXED FLUOROCHEMICAL/HYDROCARBON IMIDE AND METHIDE SALTS

FIELD OF THE INVENTION

This invention relates to electrolytes including certain imide or methide conductive salts having mixed fluorochemical and hydrocarbon groups, and the use of these salts and electrolytes in electrochemical cells, such as lithium batteries.

BACKGROUND

Industry is continually searching for new salts which can provide ionic conductivity when dissolved or dispersed in other materials. Such salts are especially useful when employed in combination with other materials to form electrolytes to conduct electrical charge in high energy density, lightweight, rechargeable power sources for use in automotive, industrial, and consumer markets, for example, electrochemical cells and devices such as batteries, fuel cells, capacitors, supercapacitors and electrochromic devices.

Many of these emerging power sources employ lithium-ion battery technology, which requires the use of an electrolyte consisting of conductive salt(s) dissolved or dispersed in matrix materials such as non-aqueous solvent(s) or polymer(s). This electrolyte acts as the medium through which ionic conduction can occur between electrodes, thus providing charge balance within the battery.

Of course, new electrolyte salts must exhibit specific chemical and physical properties to be useful in electrochemical cells and devices. Of primary importance, the salts must exhibit good ionic conductivity and should be thermally and electrochemically stable. Additionally, the salts must also exhibit good solubility at high concentration in common electrolyte solvents and/or polymers; they should exhibit inertness to other battery components (e.g., not cause corrosion of electrodes or current collectors); they should be relatively non-toxic; they should have acceptable environmental impact; and preferably they can be produced at an economically feasible price. In the case of secondary (i.e., rechargeable) batteries, the salts should exhibit good cycling behavior at room temperature and elevated temperature and should produce electrochemical cells that can be operated and maintained with minimal concerns for safety (e.g., explosions caused by thermal runaway).

There are currently only a small number electrolyte salts known to be suitable for use in lithium-ion batteries; all are lithium salts and all have identifiable drawbacks. The most common electrolyte salt is $LiPF_6$, an inorganic salt which exhibits good conductivity and corrosion resistance, but is thermally and hydrolytically unstable, decomposing to liberate fluoride ion which is detrimental to cell performance. Other inorganic salts having potential use in lithium electrolytes include $LiAsF_6$ (toxic), $LiBF_4$ (relatively poor conductivity, thermally and hydrolytically unstable), and $LiClO_4$ (thermally unstable, potentially explosive). There are also a number of organofluorine lithium salts known to be useful in battery electrolytes, but each of these salts has its own individual short-comings. Molecules like $LiOSO_2CF_3$ and $LiN(SO_2CF_3)_2$ are thermally very stable but can be corrosive to aluminum current collectors in high voltage batteries. $LiC(SO_2CF_3)_3$ is prohibitively expensive for use in most commercial scale electrochemical cell applications.

There is a continuing need for new electrolyte salts which can perform at useful conductivity levels, show low corrosivity toward aluminum current collectors, are easily handled, and can be produced at a reasonable cost.

SUMMARY OF THE INVENTION

Electrolytes comprising imide or methide conductive salts having mixed fluorochemical and hydrocarbon groups have been discovered that are alternatives to electrolytes currently used, such as metal salts of complex metal halide anions (e.g., $LiPF_6$), perfluorinated sulfonates, perfluorinated sulfonylimides and perfluorinated sulfonylmethides. By having part of the expensive perfluoroalkyl groups (FC) replaced with inexpensive hydrocarbon groups (HC), the salts of this invention can be made having lower molecular weights and thus can be used at lower weight concentrations in electrolytes to produce a given molarity solution. Nonetheless, these relatively inexpensive salts exhibit good conductivity in electrolytes.

The polymerizable mixed FC/HC imide and methide salts of this invention can be used in liquid and/or polymer electrolytes to improve the overall efficiency of the battery.

Accordingly the present invention in one aspect is a battery electrolyte which includes (a) an imide salt of the formulae

(I)

(II)

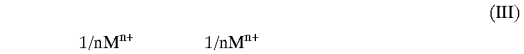
(III)

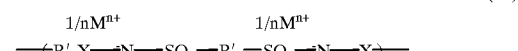
(IV)

wherein: X is $SO_2$ or $C(O)$;

$R_f$ is a fluorine atom, a straight or branched acyclic perfluoroalkyl group having from 1 to 12 carbon atoms or a cyclic perfluoroalkyl group having from 3 to 12 carbon atoms in which the perfluoroalkyl group may be interrupted by one or more catenary heteroatoms;

$R'_f$ is a straight or branched perfluoroalkylene group having from 1 to 12 carbon atoms, which may contain a cyclic moiety and which may be interrupted by one or more catenary heteroatoms;

$R_h$ is selected from the group consisting of a straight or branched aliphatic group having from 2 to 18 carbon atoms and interrupted by one or more catenary heteroatoms, a straight or branched aliphatic or cycloaliphatic group having 4 to 18 carbon atoms, a substituted or unsubstituted aromatic group, and a reactive group;

$R'_h$ is a divalent organic group, such as, for example, alkylene having 2 to 8 carbon atoms, cycloalkylalkylene, in which the alkylene group has 1–4 carbon atoms on two positions of the cycloalkyl group, i.e., an alkylene group interrupted by a cycloalkyl group of 3 to 6 carbon atoms, arylene, or aralkylene in which the alkylene group has 1–4 carbon atoms on two positions of the aryl group, i.e., an alkylene group interrupted by an aromatic group, e.g., phenyl or naphthyl, in which the alkylene group may be interrupted by one or more catenary heteroatoms;

$M^{n+}$ is a cation having a valence of n; and (b) a matrix material.

A second aspect of the present invention is a battery electrolyte which includes (a) a sulfonylmethide salt of the formula

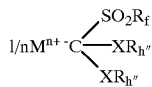

(V)

wherein:

X is $SO_2$ or $C(O)$;

$R_f$ is a fluorine atom, a straight or branched acyclic perfluoroalkyl group having from 1 to 12 carbon atoms or a cyclic perfluoroalkyl group having from 3 to 12 carbon atoms in which the perfluoroalkyl group may be interrupted by one or more catenary heteroatoms;

$R_{h''}$ is the same or different and is a straight or branched aliphatic group having 1 to 18 carbon atoms, a cycloaliphatic or cycloaliphatic alkyl group of 3 to 12 carbon atoms in which the carbon chain in both aliphatic and cycloaliphatic groups may be interrupted by one or more catenary heteroatoms; a substituted or unsubstituted aromatic or aromatic alkyl group, in which the alkyl group off the cycloaliphatic or aromatic group has 1 to 4 carbon atoms; a reactive group; and when taken together, $R_{h''}$ is an alkylene group of 2 or 3 carbon atoms or a phenylene group joined to the X group at the 1,2 or 1,3 positions of the phenylene group;

$M^{n+}$ is a cation having a valence of n; and (b) a matrix material.

A third aspect of the present invention is a battery electrolyte which includes a combination of either of the above defined imide or methide salts with a known conductive salt in a matrix.

A fourth aspect of the present invention is a battery which includes at least one cathode, at least one anode, a separator and an electrolyte as above defined.

DETAILED DESCRIPTION OF THE INVENTION

Throughout this application the following definitions apply:

"Electrochemical devices" includes all electrical energy storage devices, including electrochemical cells (e.g., batteries and fuel cells), capacitors and electrochromic devices.

"Macromolecular material" refers to a homopolymer, copolymer, or combination thereof, which may or may not be cross-linked and/or plasticized.

"Gel" refers to a physically or chemically cross-linked polymer swollen with solvent.

"Matrix material" refers to a medium (e.g., a solid, liquid, gel or plasticized polymer) in which electrolyte salts may be dissolved or dispersed to form an ionically conductive electrolyte. For a "lithium ion battery," the matrix material is liquid; for a "lithium polymer battery," the matrix material is a polymer, gel, plasticized polymer, or can be a membrane.

Voltages specified refer to electrical potential differences between a positive electrode measured relative to a Li/Li+ reference electrode, except where otherwise noted.

"Perfluoroalkyl" refers to an alkyl chain wherein all hydrogen atoms attached to carbon have been replaced by fluorine.

The term "$R_f$" appearing in Formulae I, III, V, VI and VIII can be a fluorine atom or a monovalent fluorinated radical containing at least one carbon atom. Where the radical contains a plurality of carbon atoms in a skeletal chain, such chain may be branched or cyclic. The skeletal chain of carbon atoms can be interrupted by heteromoieties, such as divalent oxygen or trivalent nitrogen atoms each of which is bonded only to carbon atoms, or hexavalent sulfur atoms, each of which may be bonded to carbon, fluorine, or oxygen atoms, but preferably where such heteromoieties are present, such skeletal chain does not contain more than one said heteromoiety for every two carbon atoms. An occasional carbon bonded hydrogen atom, bromine atom or chlorine atom may be present. Where present, however, they preferably are present not more than once for every two carbon atoms on the average. Thus, the non-skeletal valence bonds are preferably carbon-to-fluorine bonds. That is, $R_f$ is preferably perfluorinated.

The total number of carbon atoms in $R_f$ can vary and be, for example, 1 to 12, preferably 1 to 8, more preferably 1 to 4. Where $R_f$ is or contains a cyclic structure, such structure preferably has 5 or 6 ring members, one or two of which can be said heteromoieties, e.g., oxygen and/or nitrogen.

"A straight or branched aliphatic group" refers to a hydrocarbon radical which is either in the form of a straight or branched chain and, in this case, ranging from 1 to 18 carbon atoms or as otherwise designated. A preferred embodiment includes alkyl straight or branched chain from 1 to 8 carbon atoms.

"Cycloaliphatic group" is a cyclic group having from 3 to 12 carbon atoms and refers to a cyclic saturated group. Thus, the group includes, for example, cyclopropyl, cyclobutyl, cyclopentyl, cyclohexyl, and the like.

"A substituted or unsubstituted aromatic group" preferably refers to a phenyl or naphthyl group which is unsubstituted or substituted by well recognized substituents for phenyl such as, for example, alkyl of 1–4 carbon atoms, nitro, halo, trifluoromethyl, or cyano. The phenyl group may also be substituted by a "reactive group" defined below. Particularly preferred aromatic groups include $C_6H_5$—, p—$CH_3C_6H_4$—, p—$O_2NC_6H_4$—, p—$FC_6H_4$—, $(CF_3)_2C_6H_3$— and p—$NCC_6H_4$—.

The term "reactive groups" includes any group capable of reacting with itself or with other groups. For example, $R_h$ and $R_{h''}$ in Formulae I, II and V can contain a polymerizable group such as an olefinically unsaturated group (e.g., acrylate or allyl), an epoxide group, an isocyanate group and the like that would allow the imide or methide salt to react with other reactive compounds, including other molecules of the same salt or molecules of a different reactive or polymerizable compound, via grafting or polymerization (cationic, anionic or free radical mechanism) to form a homopolymer or a copolymer. Such a homopolymer or copolymer material would be useful in electrolytes, particularly as single ion conductors. Suitable reactive groups may be chosen from those groups containing olefinic unsaturated groups (e.g., vinyl, allyl, vinylbenzyl, acryloyl or methacryloyl groups) or from those groups containing reactive heterocyclic ring structures (e.g., oxirane (epoxy), oxetane, azetidine or aziridine groups). A suitable reactive group may also be an alcohol, amine, isocyanate or di- or trialkoxysilyl group. When the reactive group could interfere with reactions for preparing the desired imide or methide, the reactive group can be protected by reactants that are reversibly bound to it. For example, a double bond may be protected as a dihalo derivative and subsequently dehalogenated. Examples of suitable reactive groups in $R_h$ and $R_{h''}$ include $CH_2=CH-$, $CH_2=CHCH_2-$, $CH_2=C(CH_3)-$, $CH_2=CHC(O)OCH_2CH_2-$, $-CH_2=CH-C_6H_4-$, $CH_2=C(CH_3)C(O)OCH_2CH_2-$, c$-C_2H_3O-CH_2-$ (glycidyl), $HOCH_2CH(OH)CH_2-$, $CH\equiv CCH_2-$, $OCN-C_6H_4-$, c$-C_2H_3NH-CH_2-$ (aziridyl), $(CH_3O)_3-Si-C_3H_6-$, $(CH_3O)_2(CH_3)SiC_3H_6-$, $HOCH_2CH_2-$, and $H_2NCH_2CH_2-$.

The term "$R'_h$" appearing in Formulae III and IV includes a fluorine-free divalent organic group, such as, for example, alkylene having 2 to 8 carbon atoms, cycloalkylalkylene, in which the alkylene group has 1–4 carbon atoms on two positions of the cycloalkyl group, i.e. an alkylene group interrupted by a cycloalkyl group of 3 to 6 carbon atoms, arylene, or aralkylene in which the alkylene group has 1–4 carbon atoms on two positions of the aryl group, i.e. an alkylene group interrupted by an aromatic group, e.g. phenyl or naphthyl, in which the alkylene group may be interrupted by one or more catenary heteroatoms. The substituents on the aromatic ring may be those defined above. Examples of suitable fluorine-free divalent organic groups include

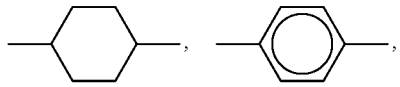

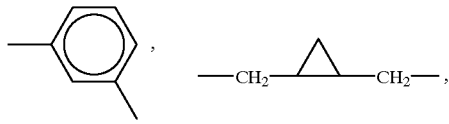

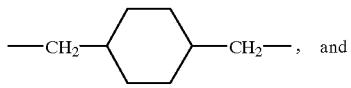

"A catenary heteroatom" refers to an internal heteroatom such as for example nitrogen, oxygen, or sulfur, bonded between carbon atoms. Preferred heteroatoms are nitrogen or oxygen. These heteroatoms may interrupt the chain of an aliphatic or cycloaliphatic hydrocarbon.

"Perfluoroalkylene" refers to either straight or branched divalent organic perfluorinated group. Preferred perfluoroalkylene groups are perfluoroethylene, perfluoropropylene and perfluorobutylene. The perfluoroalkylene group may also be interrupted by a catenary heteroatom as defined above.

"Alkylene" refers to either a straight or branched divalent organic group. Preferred alkylene groups are ethylene or propylene and may join at both ends to other groups or atoms to form a long chain or a ring.

Suitable cations, $M^{n+}$, for the salts used in the present invention include alkali metal cations (e.g., $Li^+$, $Na^+$, $K^+$ and $Cs^+$), alkaline earth metal cations (e.g., $Mg^{2+}$, $Ca^{2+}$, $Sr^{2+}$ and $Ba^{2+}$), Group IIIA metal cations (e.g., $Al^{3+}$), transition metal cations (e.g., $Fe^{3+}$, $Fe^{2+}$, $Zn^{2+}$, $Ti^{4+}$ and $Cu^{2+}$), rare earth metal cations (e.g., $Ce^{4+}$ and $La^{3+}$), tetraalkylammonium cations (i.e., $R_4N^+$), trialkylammonium cations (i.e., $R_3NH^+$) (where $R_3$ and $R_4$ are an alkyl group containing 1 to 4 carbon atoms) and protons (i.e., $H^+$). Preferably, the cation is an alkali metal cation. Most preferably, the cation is a lithium cation.

Imide Salts

With regard to the imide electrolyte salts of the present invention, the following definitions particularly apply:

In Formula I, preferred $R_f$ groups include $CF_3-$, $C_2F_5-$, $C_4F_9-$, $C_8F_{17}-$, $(CF_3)_2NC_2F_4-$, $CF_3OC_2F_4-$,

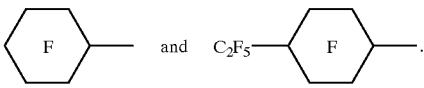

In Formula II, preferred $R'_f$ groups include $-CF_2CF_2-$, $-(CF_2)_4-$, $-CF_2CF(CF_3)-$ and

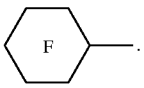

In Formulae I or II, suitable substituted or unsubstituted aliphatic $R_h$ groups containing at least 4 carbon atoms include $C_4H_9-$, $C_6H_{13}-$, $C_8H_{17}-$, and

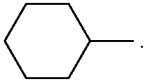

In Formulae I or II, suitable substituted or unsubstituted aliphatic $R_h$ groups containing one or more catenary heteroatoms preferably have 2 to 8 carbon atoms and include, for example, $CH_3OCH_2CH_2-$, $CH_3OCH_2CH_2OCH_2CH_2-$, and $(CH_3)_2NCH_2CH_2-$.

With particular regard to the imide salts of the present invention, a preferred embodiment of these salts include a polymeric salt of Formula VI:

(VI)

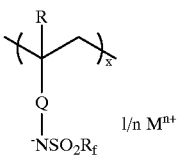

wherein:

x indicates a repeating unit;

R is hydrogen, a methyl, ethyl, propyl or butyl group;

Q is a divalent connecting group, with Q preferably being $-C_6H_4SO_2-$ or $-C(O)-$; and $R_f$, M and n are defined as for Formula I.

Another preferred embodiment of the present invention with regard to imide salts includes a salt of Formula VII:

(VII)

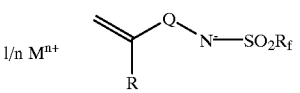

wherein:

Q is a divalent connecting group, with Q preferably being $-C_6H_4SO_2-$ or $-C(O)-$;

R is hydrogen, a methyl, ethyl, propyl or butyl group; and $R_f$, M and n are defined as for Formula I.

Examples of imide salts that are particularly suitable for this invention include, but are not limited to:
$C_4H_9SO_2NLiSO_2CF_3$
$C_8H_{17}SO_2NLiSO_2CF_3$
$CH_3OCH_2CH_2SO_2NLiSO_2CF_3$
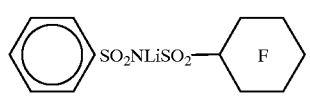
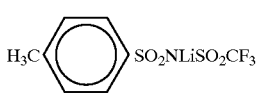
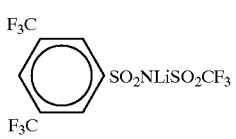
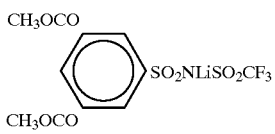
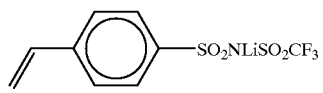
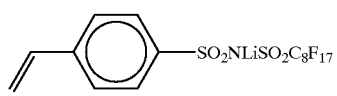
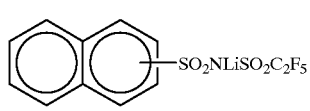
$C_7H_{15}CONLiSO_2CF_3$
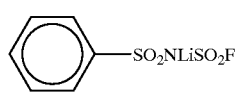
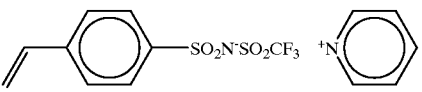
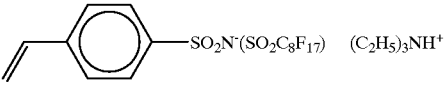
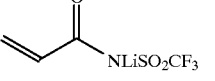
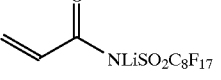
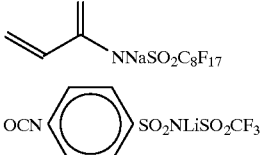
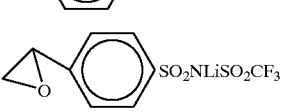
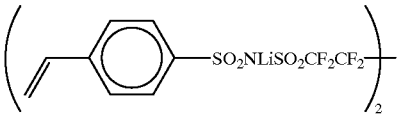
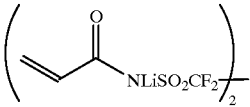
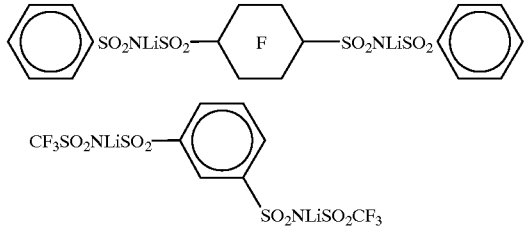
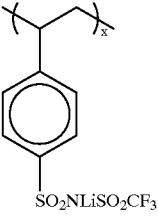
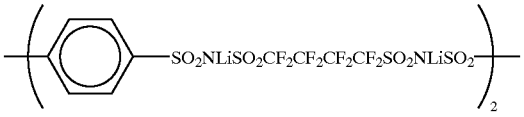
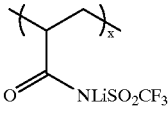
In general, the imide salts of this invention can readily be made by reacting a fluorocarbon sulfonyl halide or hydrocarbon sulfonyl or carbonyl halide with ammonia, followed by reaction of the resulting amide with a hydrocarbon sulfonyl or carbonyl halide or fluorocarbon sulfonyl halide, respectively, to form the desired imide. The two-step reaction can follow either of the following reaction schemes:

SCHEME I

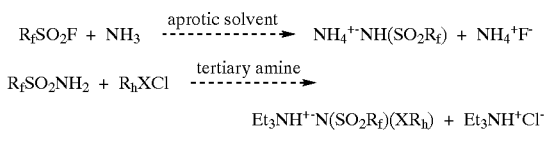

SCHEME II

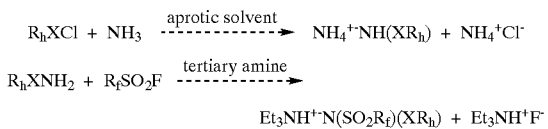

These reaction schemes are described in U.S. Pat. Nos. 5,514,493 and 5,652,072, both of which are incorporated herein by reference.

The amide and imide reactions are typically run in an aprotic solvent, preferably in a polar aprotic solvent such as acetonitrile, tetrahydrofuran (THF), diethyl ether or dimethylsulfoxide, with a molar excess of tertiary amine, such as triethylamine or pyridine, to consume the hydrogen halide acid generated and thus drive the reaction to completion. The reaction can be run at a temperature of approximately 0° C. to 150° C., preferably at 0° C. to 100° C., cooling the reaction vessel if necessary to keep the exotherm under control. The resulting triethylammonium salt solution can be filtered to remove any solid by-products, and the filtrate can be stripped of solvent. To exchange the triethylammonium cation with the desired cation, the tertiary amine salt can be neutralized with an appropriate base to form the salt directly. Purification of the salt can be achieved by re-dissolving the crude solids in tetrahydrofuran and passing this solution through a short column of alumina to adsorb impurities. Alternatively, the tertiary amine salt can be acidified in aqueous solution and extracted with a water-immiscible polar solvent to recover the desired imide acid, $R_fSO_2NHXR_h$ which can be isolated by evaporating the solvent. The imide acid can, in turn, be neutralized in water with either an inorganic base (e.g., NaOH, $K_2CO_3$, LiOH, CaO, $CuCO_3$ or $Fe(OH)_3$) or an organic base, usually an amine or a quaternary ammonium hydroxide, to give the desired metal or ammonium salt.

Processes useful for the synthesis of fluorochemical imide salts are described in:

1. D. D. Des Marteau et al., *Inorg. Chem.*, 1984, 23, pp. 3720–3723;
2. D. D. Des Marteau et al., *Inorg. Chem.*, 1990, 29, pp. 2982–2985;
3. Canadian Patent 2000142-A;
4. U.S. Pat. No. 4,505,997; and
5. U.S. Pat. No. 5,072,040.

Polymeric imide salts represented by Formula (VI), having a wide range of molecular weights, can be prepared from their corresponding ethylenically unsaturated monomeric salts represented by Formula (VII) using standard free radical polymerization techniques known in the art. Such polymeric salts can be homopolymers of the monomeric salts, or, alternatively, copolymers of the monomeric salts with low polarity comonomers, such as methyl methacrylate, n-butyl acrylate, styrene, vinyl acetate or vinylidene chloride. Such salt polymerizations can be carried out neat, in the presence of a solvent (e.g., acetone, ethyl acetate, isopropyl alcohol, tetrahydrofuran or methylene chloride), or in a blend of such solvents. A standard free radical polymerization initiator, such t-butylperoctoate or 2,2'-azobisisobutyronitrile, can be employed at a concentration of 0.5 to 2.0 percent by weight, based on the weight of the monomers employed. Optionally, if a low molecular weight polymeric salt is desired, a standard chain transfer agent, such as isooctylthioglycolate, can be incorporated, typically at 2 to 5 percent based on the weight of monomers employed. Salt polymerizations may also be carried out in aqueous media, dispersing the monomer(s) in water using an emulsifier such as sodium lauryl sulfate or sodium dodecylbenzenesulfonate and polymerizing with an initiator such as ammonium persulfate or t-butylhydroperoxide. Polymeric salt solutions can be dried to a low water and solvent content and then incorporated into the desired matrix material to make the electrolyte. Alternatively, the polymeric imide salts can be prepared by carrying out the polymerization from the corresponding monomers in the presence of the matrix material.

Methide Salts

The methide salts used as battery electrolytes in the present invention and represented by a compound of Formula V above are defined using the same definition of terms as above defined for the imides. The following definitions also particularly apply:

$R_{h''}$ in Formula V is as defined above. However, as an aromatic group, $R_{h''}$ is preferably phenyl which may be substituted or unsubstituted. In this case, the phenyl group is preferably substituted by alkyl of 1 to 4 carbon atoms or a reactive group, preferably a polymerizable group as defined above. $R_{h''}$ may independently be a polymerizable group as above defined. Furthermore, both $R_{h''}$ groups may be taken together to form an alkylene group which will then join with the group X, preferably when X is $SO_2$ to form a 5 or 6 member ring.

A preferred embodiment of the methide salts is a compound having an anion of the formula:

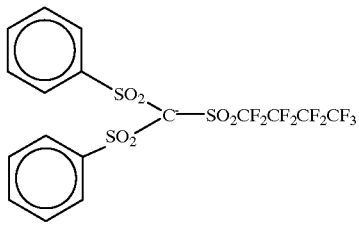

An alternative preferred methide salt is a compound having an anion of the formula:

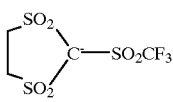

In general, methide salts according to Formula V can be prepared by methods similar to those used to prepare perfluoroalkylsulfonyl methides, such methods being known in the chemical art. For example, a bis-alkylsulfonyl methane or a bis-arylsulfonylmethane (e.g., a 1,1-disulfone, such as $(C_6H_5SO_2)_2CH_2$) can be reacted with two equivalents of a very strong base (e.g., methyl magnesium chloride), and the resultant dianion can be reacted with a perfluoroalkyl sulfonyl halide to form a methide anion. An exemplary reaction scheme is as follows:

2CH$_3$MgCl

CH$_2$(SO$_2$R$_{h''}$)(SO$_2$R$_{h''}$)+→(R$_{h''}$SO$_2$)(R$_{h''}$SO$_2$)C$^{-2}$ 2MgCl$^+$ (R$_{h''}$SO$_2$)(R$_{h''}$SO$_2$)C$^{-2}$ 2MgCl$^+$+R$_f$SO$_2$X→(R$_{h''}$SO$_2$)(R$_{h''}$SO$_2$)C$^-$(SO$_2$R$_f$).

If desired, the disulfone reactant can be cyclic (e.g., 1,3-dithiolane-1,1,3,3-tetraoxide). To create alkylcarbonyl substitutions, bis-carbonyl methanes, e.g., (C$_6$H$_5$CO)$_2$CH$_2$, can be used in place of bis-sulfonyl methanes. By controlling whether R$_{h''}$ groups are the same or different and which are present on the disulfone or bis-carbonyl, the makeup of the methide substitutions can be controlled. A reaction temperature of preferably at least about 80° C. is desirable to drive the reaction to completion when using a perfluoroorganic sulfonyl fluoride.

Processes useful for the synthesis of fluorochemical methide salts and their conjugate acids are described in:

1. U.S. Pat. No. 5,273,840;
2. Turowsky and Seppelt, *Inorg. Chem.*, (1988) 27 pp. 2135–2137; and
3. Koshar and Mitsch, *J. Org. Chem.*, 38 3358–63 (1973).

Perfluoroalkylsulfonyl fluorides used as precursors to the imide and methide salts of this invention can be prepared by a variety of methods known in the art as described, for example, in U.S. Pat. Nos. 3,542,864; 5,318,674; 3,423,299; 3,951,762; 3,623,963; 2,732,398, and S. Temple, *J. Org. Chem.*, 33(1), 344 (1968), D. D. DesMarteau, *Inorg. Chem.*, 32, 5007 (1993), all of which are incorporated herein by reference in their entirety.

To prepare the perfluoroorganosulfonyl fluoride, the corresponding hydrocarbon sulfonyl fluoride (prepared, e.g., according to techniques described in Hansen, U.S. Pat. No. 3,476,753, which is incorporated by reference in its entirety) can be perfluorinated by electrochemical fluorination according to the methods described in Hansen U.S. Pat. No. 3,476,753, Simons, U.S. Pat. No. 2,519,983, and *Chemistry of Organic Fluorine Compounds*, Milos Hudlicky, ed., 2d ed., PTR Prentice Hall (New York), pp. 73–76 (all of which are incorporated by reference in their entirety), followed by purification.

Battery Electrolyte Compositions

For some battery electrolyte compositions, it is desirable to add other conductive salts in order to maximize battery performance. Typically any conventional conductive salt known for chemical power sources may be used. For example, an additional conductive salt may include:

a cation selected from the group consisting of an alkali metal; an alkaline earth metal; a Group IIB metal; a Group IIIB metal; a transition metal; a rare earth metal; an ammonium cation such as tetraalkylammonium and trialkylammonium; and a proton; and an anion selected from the group consisting of NO$_3$$^-$, Br$^-$, I$^-$, BF$_4$$^-$, PF$_6$$^-$, AsF$_6$$^-$, ClO$_4$$^-$, SbF$_6$$^-$ and a perfluorinated anion, wherein the perfluorinated anion may be:

a perfluorinated sulfonate anion of the formula R$_{f0}$SO$_3$$^-$, in which R$_{f0}$ is a perfluoroalkyl group having between 1 and 12 carbon atoms which may contain straight, branched or cyclic moieties;

a perfluorinated acyclic imide anion of the formula (R$_{f1}$SO$_2$)(R$_{f2}$SO$_2$)N$^-$, in which R$_{f1}$ and R$_{f2}$ are each independently a perfluoroalkyl group of 1 to 8 carbon atoms which may contain straight, branched or cyclic moieties, with R$_{f1}$ and R$_{f2}$ having a total of up to 12 carbon atoms;

a perfluorinated cyclic imide anion of the formula

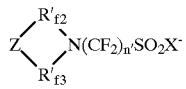

in which R'$_{f1}$ is a perfluoroalkylene moiety of 2 to 4 carbon atoms, optionally substituted by a straight or branched perfluoroalkyl group of 1 to 2 carbon atoms, with R'$_{f1}$ having a total of up to 6 carbon atoms;

a perfluorinated sulfonate, imide or methide anion of the formula (R$_{f3}$)(R$_{f4}$)N(CF$_2$)$_n$SO$_2$X$^-$ or

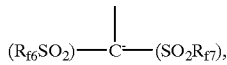

in which R$_{f3}$ and R$_{f4}$ independently are —C$_m$F$_{2m+1}$, or —(CF$_2$)$_q$SO$_2$X$^-$, and R'$_{f1}$ and R'$_{f3}$ independently are perfluoroalkylene moieties having the formula —C$_r$F$_{2r}$—; wherein X$^-$ is —O$^-$, —N$^-$SO$_2$(R$_{f5}$) or

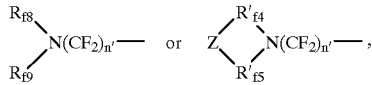

wherein R$_{f5}$, R$_{f6}$ and R$_{f7}$ independently are —C$_m$F$_{2m+1}$, —(CF$_2$)$_4$—SO$_2$—X$^-$, $$\underset{R_{f9}}{\overset{R_{f8}}{\diagdown}}N(CF_2)_{n'}—\quad \text{or} \quad Z\underset{R'_{f5}}{\overset{R'_{f4}}{\diagdown}}N(CF_2)_{n'}—,$$

wherein R$_{f8}$ and R$_{f9}$ are each independently a straight, branched or cyclic perfluoroalkyl group of 1 to 8 carbon atoms, with R$_{f8}$ and R$_{f9}$ having a total of up to 12 carbon atoms;

Z is —CF$_2$—, —O—, —N(R$_{f10}$)— or —SF$_4$—, wherein R$_{f10}$ is —C$_m$F$_{2m+1}$, or —(CF$_2$)$_q$—SO$_2$—X$^-$;

R'$_{f4}$ and R'$_{f5}$ independently are perfluoroalkylene moieties having the formula —C$_r$F$_{2r}$—;

n' is 1 to 4 inclusive; m is 1 to 12 inclusive, preferably 1 to 8 inclusive; r is 1 to 4 inclusive; and q is 1 to 4 inclusive;

a bis(perfluoroalkylsulfonyl) methide anion of the formula (R$_{f11}$SO$_2$)C$^-$(R)(SO$_2$R$_{f12}$), in which R$_{f11}$ and R$_{f12}$ independently are perfluoroalkyl groups having between 1 and 12 carbon atoms, preferably between 1 and 4 carbon atoms, and R is H, Br, Cl, I, an alkyl group having between 1 and 20 carbon atoms, an aryl group or an alkaryl group;

and a tris(perfluoroalkylsulfonyl) methide anion of the formula $^-$C(SO$_2$R$_{f13}$)(SO$_2$R$_{f14}$)(SO$_2$R$_{f15}$), in which R$_{f13}$, R$_{f14}$, and R$_{f15}$ independently are perfluoroalkyl groups having between 1 and 12 carbon atoms, preferably between 1 and 4 carbon atoms.

Preferred additional conductive salts includes those having a lithium cation and having an anion selected from the group consisting of PF$_6$$^-$ anion; ClO$_4$$^-$ anion; BF$_4$$^-$ anion; a perfluorinated sulfonate anion of the formula R$_{f0}$SO$_3$$^-$, in which R$_{f0}$ is a perfluoroalkyl group having from 1 to 4 carbon atoms; a perfluorinated acyclic imide anion of the formula $(R_{f1}SO_2)(R_{f2}SO_2)N^-$, wherein $R_{f1}$ and $R_{f2}$ are each independently a straight or branched perfluoroalkyl group having from 1 to 4 carbon atoms, with $R_{f1}$ and $R_{f2}$ having a total of up to 5 carbon atoms; a perfluorinated cyclic imide anion of the formula:

in which $R'_{f1}$ is a perfluoroalkylene moiety of 2 to 4 carbon atoms, optionally substituted by a straight or branched perfluoroalkyl group of 1 to 2 carbon atoms, with $R'_{f1}$ having a total of up to 6 carbon atoms; and a tris (perfluoroalkylsulfonyl) methide anion of the formula $^-C(SO_2R_{f13})(SO_2R_{f14})(SO_2R_{f15})$, in which $R_{f13}$, $R_{f14}$, and $R_{f15}$ independently are perfluoroalkyl groups having between 1 and 4 carbon atoms.

More preferred additional conductive salts are lithium hexafluorophosphate, lithium bis(trifluoromethanesulfonyl) imide, lithium bis(pentafluoroethanesulfonyl)imide, lithium tetrafluoroborate, lithium perchlorate, lithium trifluoromethylsulfonate, lithium tris (trifluoromethanesulfonyl)methide, or a mixture thereof.

To form the electrolyte composition, the conductive salts are mixed with the matrix material such that the salts are at least partially dissolved or dispersed in the matrix material. The salts are preferably employed at a concentration such that the conductivity of the electrolyte solution is at or near its maximum value, although a wide range of other concentrations will also serve.

The matrix material may be in the form of a solid, liquid, gel or a liquid impregnated porous membrane. For battery applications, the matrix material is chosen to provide the particular conductivity, viscosity, mechanical strength, reactivity and stability desired for the electrolyte.

Suitable matrix materials for preparing electrolyte solutions can be liquid, polymeric or mixtures of polymer and liquid. Examples of suitable solid matrix materials include polymers and copolymers such as polyethers like poly (ethylene oxide), polyesters, polyacrylates, polyphosphazenes, polysiloxanes, poly(propylene oxide), fluoropolymers (e.g., poly(vinylidene fluoride)), and poly (acrylonitrile), as well as the polymers and copolymers described in Armand et al., U.S. Pat. No. 4,505,997, incorporated herein by reference, and mixtures thereof. The polymers may be used in cross-linked or uncross-linked form and plasticized. Such materials are generally dry, i.e., have a water content less than about 100 ppm, preferably less than about 50 ppm.

In batteries comprising a highly reducing electrode (such as lithium metal) and a liquid matrix material, the liquid is preferably a nonaqueous, polar, aprotic, organic solvent. Such liquids are generally dry, i.e., have a water content less than about 100 ppm, preferably less than about 50 ppm. Examples of suitable aprotic liquids include linear ethers such as diethyl ether, diethylene glycol dimethyl ether, and 1,2-dimethoxyethane; cyclic ethers such as tetrahydrofuran, 2-methyltetrahydrofuran, dioxane, dioxolane, and 4-methyldioxolane; esters such as methyl formate, ethyl formate, methyl acetate, dimethyl carbonate, diethyl carbonate, propylene carbonate, ethylene carbonate, and butyrolactones (e.g. gamma butyrolactone); nitriles such as acetonitrile and benzonitrile; nitro compounds such as nitromethane or nitrobenzene; amides such as N,N-dimethylformamide, N,N-diethylformamide, and N-methylpyrrolidinone; sulfoxides such as dimethyl sulfoxide; sulfones such as dimethylsulfone; tetramethylene sulfone, and other sulfolanes; oxazolidinones such as N-methyl-2-oxazolidinone and mixtures thereof. Maximum conductivities of the electrolyte salts of this invention in typical nonaqueous, polar, aprotic liquid media (e.g., propylene carbonate) are generally in the range of 0.1–20 mS (milliSiemens) at room temperature, preferably greater than 1 mS.

Mixtures of matrix materials can be employed and are sometimes preferred in tailoring the matrix material's properties to provide optimum performance. In general, the amount of matrix material is selected such that the total salt concentration ranges from about 0.1M (moles per liter) to about 2.0M, preferably about 1M. Preferably, the salt concentration in the electrolyte is from about 0.5 to 1.5M.

A preferred chemical power source of the present invention relates to a battery that includes at least one cathode, at least one anode, a separator and liquid electrolyte comprising conductive salts and aprotic solvents.

The electrodes (i.e., anode and cathode) of, for example, a lithium battery generally consist of a metallic foil and particles of active material blended with a conductive diluent such as carbon black or graphite bound into a plastic material binder. Typical binders include polytetrafluoroethylene, polyvinylidene fluoride, ethylene-propylene-diene (EPDM) terpolymer, and emulsified styrene-butadiene rubber (SBR), and the binder may be cross-linked. The binder may also be, for example, a solid carbon matrix formed from the thermal decomposition of an organic compound. The metallic foil or composite electrode material is generally applied to an expanded metal screen or metal foil (preferably aluminum, copper or nickel) current collector using a variety of processes such as coating, casting, pressing or extrusion.

Examples of suitable battery anodes include lithium metal, lithium metal alloys, sodium metal, carbon-based materials such as graphite, coke, carbon fiber, pitch, transition metal oxides (such as $LiTi_5O_{12}$ and $LiWO_2$), and lithiated tin oxide. In the case of lithium ion batteries, the lithium may be intercalated into a host material such as carbon (i.e., to give lithiated carbon) or carbon alloyed with other elements (such as silicon, boron and nitrogen), a conductive polymer, or an inorganic host that is intercalatable (such as $Li_xTi_5O_{12}$). The material comprising the anode may be carried on foil (e.g., nickel and copper) backing or pressed into expanded metal screen and alloyed with various other metals.

Examples of suitable cathode materials include graphite, amorphous carbon, $Li_xCoO_2$, $Li_xNiO_2$, Co-doped $Li_xNiO_2$, $Li_xMn_2O_4$, $Li_xMnO_2$, $V_2O_5$, $V_6O_{13}$, $LiV_3O_8$, $Ba_2SmNiO_5$, $SmMnO_3$, $Sm_3Fe_5O_{12}$, $EuFeO_3$, $EuFe_5O_{12}$, $EuMnO_3$, $LaNiO_3$, $La_2CoO_4$ and $LaMnO_3$ (including the charged and discharged forms of these materials), and conducting polymers such as polypyrrole, polysulfides and polyvinylferrocene. In primary batteries, the cathode can be fluorinated carbon (e.g., $(CF)_n$), $SO_2Cl_2$, $Ag_2CrO_4$, sulfur, polysulfide, and an $O_2$ or $SO_2$ electrode.

Lithium batteries and supercapacitors usually contain a separator to prevent short-circuiting between the cathode and anode. The separator usually consists of a single-ply or multi-ply sheet of microporous polymer (typically polyolefin, e.g., polyethylene, polypropylene, or combinations thereof) having a predetermined length and width and having a thickness of less than 10 mils (0.025 cm). For example, see U.S. Pat. No. 3,351,495 (Larsen et al.), U.S. Pat. No. 4,539,256 (Shipman et al.), U.S. Pat. No. 4,731,304

(Lundquist et al.) and U.S. Pat. No. 5,565,281 (Yu et al.). The pore size in these microporous membranes, typically about 5 microns in diameter, is sufficiently large to allow transport of ions but is sufficiently small to prevent cathode/anode contact, either directly or from particle penetration or dendrites which can form on the electrodes.

The invention is illustrated further by, but is not intended to be limited to, the following examples.

EXAMPLES

Test Methods
Conductivity—Liquid Electrolyte

Conductivity measurements for liquid electrolytes were generally made using a 1 molar (1M) electrolyte derived from carefully purified and dried components. The 1M electrolyte was made by dissolving 10 millimoles of electrolyte salt in 10 mL of a 50/50 (vol) mixture of propylene carbonate (PC)/1,2-dimethoxyethane (DME) or ethylene carbonate (EC)/dimethyl carbonate (DMC). 10 mL of the resulting electrolyte was placed in a glass container with a conductivity cell having K=1.0/cm (Model No. 3403, available from YSI Inc., Yellow Spring, Ohio), all kept in a dry box before use. During all times, water contamination in the electrolyte was kept below 30 ppm, as determined by Karl Fischer titration. Impedance response was then measured in milli-Siemens per square centimeter (mS/cm) using a PAR Model 273 potentiostat/galvanometer (available from EG&G Princeton Applied Research, Princeton, N.J.), equipped with a frequency response analyzer (Model 1260, available from Schlumberger, Billerica, Mass.). The impedance response for each cell was measured using an AC signal of 5–10 mv over a frequency response of 100,000 to 1 Hz, using Model 398 Electrochemical Software (available from EG&G Princeton Applied Research). The conductivity was then calculated from the impedance response.

Other concentrations, ranging from 0.2–2.0 M, were also evaluated to identify the concentration for maximum conductivity.

Repassivation Potential

The repassivation potential of the candidate salt was measured using a cyclic voltammetry test employing aluminum as a working electrode, using the technique generally described in Bard and Faulkner, Electrochemical Methods: Fundamentals and Applications, John Wiley and Sons, New York, 1980, pp. 350–353. The repassivation potential is an excellent predictor of the degree of corrosion to be expected when aluminum is used in an electrode, especially as a current collector.

For each cyclic voltammetry measurement, a three-electrode cell was used, having aluminum as the working electrode, metallic lithium as the reference electrode and metallic lithium as the auxiliary electrode. To construct a working electrode, a Model AL commercial aluminum electrode, (available from Bioanalytical Systems, West Lafayette, Ind.) was used having a planar electrode area of 0.0 cm². Prior to running each cyclic voltammetry test, the native metal oxide layer was removed from the aluminum electrode by polishing the electrode with 3 μm aluminum oxide paper using dimethyl carbonate as a lubricant. A lithium wire inserted in a luggin glass capillary served as a reference electrode, and a 10 cm² lithium flag was used as the auxiliary electrode.

After polishing, the three electrodes and a glass cell for holding the electrolyte were all placed in an oxygen- and moisture-free dry box, and the three electrodes were connected to a potentiostat. Each electrolyte salt to be evaluated was dissolved at 1M concentration in a 1:1 (vol) blend of ethylene carbonate:dimethyl carbonate to form the test electrolyte (containing less than 50 ppm water, as determined by Karl Fischer titration), and 10 mL of each test electrolyte was placed in the glass cell. A scan at the rate of approximately 1 mV/sec was taken from 1 V up to at least 5 V (vs. the reference electrode), followed by gradually returning the potential to 1 V, and the current was measured as a function of voltage potential. The repassivation potential was defined as that voltage at which the measured current of the hysteresis loop fell precipitously back to a value close to the currents measured during the early part of the forward scan (i.e., the point of inflection on the curve).

Sources, Preparations for Electrolyte Salts
HQ-115

Fluorad™ HQ-115 Lithium Trifluoromethanesulfonimide (available from 3M Co.) was used as the source of $(CF_3SO_2)_2N^-Li^+$.

BETI $(C_2F_5SO_2)_2N^-Li^+$, sometimes abbreviated as "BETI," was prepared using the procedure described in Example 3 of U.S. Pat. No. 5,652,072, which is herein incorporated by reference.

Salt 1. Lithium Styrenyl Trifluoromethyl bis-Sulfonyl Imide,

4.48 g of styrene sulfonyl chloride was dissolved in a mixture of 35 mL of dry acetonitrile and 10 mL of triethylamine. The solution was cooled to 0° C., then to this solution was added slowly 3.30 g of trifluoromethylsulfonamide, $CF_3SO_2NH_2$, dissolved in 35 mL of acetonitrile. The resulting yellow solution was warmed to room temperature and was stirred for one hour. The solvent was removed on a rotary evaporator and the resulting red solid was dissolved in 100 mL of 1M aqueous LiOH. After removal of the solvent, 200 mL of diethyl ether was added. The resulting suspension was stirred for one hour, filtered and the ether was removed to give 5.4 g of a yellow solid which was identified as the desired product. Refluxing the yellow solid with $CH_2Cl_2$ to remove impurities gave 4.18 g of a light yellow powder (59% yield). NMR analysis of this light yellow powder produced the following data: $^1H$ ($CD_3CN$, 400 MHz)δ 7.83 (d, J=9.4 hz), 7.56 (2H, d, J=9.5 hz), 6.80 (1H, dd, J=17.7, 11.0 hz), 5.91 (1H, d, J=17.5 hz), 5.38 (1H, d, J=10.8 hz); $^{19}F$ ($CD_3CN$, 376 MHz)δ −78.26(s).

Salt 2. Lithium Styrenyl Trifluoromethyl bis-Sulfonyl Imide Polymer.

4.84 g of lithium styrenyl trifluoromethyl bis-sulfonyl imide was dissolved in 150 mL of deionized water. 100 mg of ammonium persulfate was added and the resulting solution was heated to 80° C. for 16 hours. The solvent was then removed to give a glassy polymer. Glass transition temperature, $T_g$, of the polymer was determined to be ca. 250° C. by differential scanning calorimetry (DSC), and the weight average molecular weight (Mw) was found to be about 800,000 using gel permeation chromatography (GPC).

Salt 3. Lithium Phenyl Trifluoromethyl bis-Sulfonyl Imide,

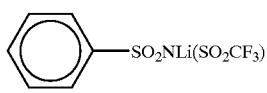

This imide was prepared using essentially the same procedure as described for making lithium styrenyl trifluoromethyl bis-sulfonyl imide, except that benzene sulfonyl chloride was substituted for the styrenyl sulfonyl chloride. NMR: $^1$H (CD$_3$CN, 400 MHz) 7.87 (2H, m), 7.50 (3H, m); $^{19}$F (CD$_3$CN, 376 MHz) −78.21 (3F, s).

Salt 4. Naphthyl Pentafluoroethyl bis-Sulfonyl Imide

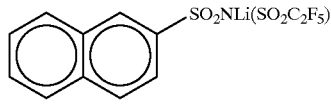

The imide was prepared using essentially the same procedure as described for Salt 1, except that naphthyl sulfonyl chloride was substituted for the styrenyl sulfonyl chloride and pentafluoroethyl sulfonamide was substituted for trifluoromethyl sulfonamide.

Salt 5. Phenyl Pentafluoroethyl bis-Sulfonyl Imide,

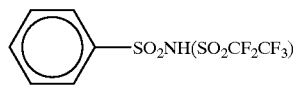

This imide acid was prepared using essentially the same procedure as described for making lithium phenyl trifluoromethyl bis-sulfonyl imide, except that pentafluoroethylsulfonamide, CF$_3$CF$_2$SO$_2$NH$_2$, was substituted for the trifluoromethylsulfonamide. The sample was acidified with sulfuric acid. NMR: $^1$H (D2O, 400 MHz) 7.93 (2H, d), 7.67 (1H, m), 7.61 (2H, t); $^{19}$F (D2O, 376 MHz) −113.9, −76.0 (3F, s).

Salt 6. Triethylammonium Styrenyl Perfluorooctyl bis-Sulfonyl Imide,

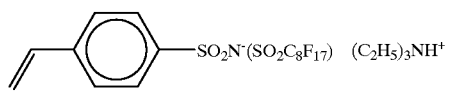

This imide was prepared using essentially the same procedure as described for making lithium styrenyl trifluoromethyl bis-sulfonyl imide, except that perfluorooctylsulfonamide, C$_8$F$_{17}$SO$_2$NH$_2$, was substituted for the trifluoromethylsulfonamide, and no neutralization with LiOH was performed. NMR: $^1$H (CD$_3$CN, 400 MHz) 7.81 (2H, d), 7.53 (2H, d), 6.80 (1H, dd), 5.9 (1H, d), 5.38 (1H, d), 3.05 (6H, q), 1.25 (9H, t); $^{19}$F (CD$_3$CN, 376 MHz) −80.3 (3F, s), −112.2 (2F, s), −119.5 (2F, s), −121.0 (6F, m), −121.9 (2F, s), −125.2 (2F, s).

Salt 7. Lithium Styrenyl 1,4-Perfluorobutylene bis-Sulfonyl Imide,

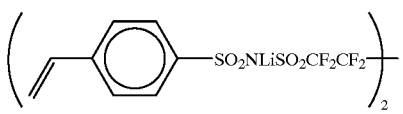

This imide was prepared using essentially the same procedure as described for making lithium styrenyl trifluoromethyl bis-sulfonyl imide, except that half the molar amount of 1,4-perfluorobutylenedisulfonamide, H$_2$NSO$_2$(CF$_2$)$_4$SO$_2$NH$_2$, was substituted for the trifluoromethylsulfonamide. The disulfonamide may be derived by amidation with ammonia of FSO$_2$(CF$_2$)$_4$SO$_2$F, whose preparation is described at column 6 of U.S. Pat. No. 2,732,398 (Brice et al.). NMR: $^1$H (CD$_3$CN, 400 MHz) 7.81 (2H, d), 7.46 (2H, d), 6.80 (1H, dd), 5.90 (1H, d), 5.38 (1H, d); $^{19}$F (CD$_3$CN, 376 MHz) −112.2 (2F, br s), −119. (2F, br s).

Salt 8. Lithium p-Fluorophenyl Pentafluoroethyl bis-Sulfonyl Imide,

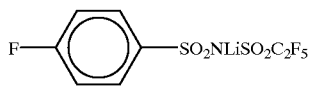

This imide was prepared using essentially the same procedure as described for making lithium styrenyl trifluoromethyl bis-sulfonyl imide (Salt 1), except that 4-fluorobenzene sulfonyl chloride was substituted for the styrenyl sulfonyl chloride and pentafluoroethylsulfonamide was substituted for trifluoromethylsulfonamide. NMR: $^1$H (CD$_3$CN, 400 MHz) 7.89 (2H, m), 7.20 (2H, m); $^{19}$F (CD$_3$CN, 376 MHz) −78.23 (3F, s), −109.1 (1F, m).

Salt 9. Lithium (Trifluoromethylsulfonyl)(Acrylyl) bis-Imide, CH$_2$=CH—C(O)NLi(SO$_2$CF$_3$)

74.5 g of trifluoromethylsulfonamide was dissolved in 1000 mL of acetonitrile. The solution was cooled in an ice bath (0° C.) under nitrogen, and 54 g of acryloyl chloride was added dropwise while stirring. 202 g of triethylamine was then added to the mixture in a similar fashion, and the reaction was stirred at 0° C. under nitrogen for 2 hours. The resulting brown solution was filtered, solvent was removed from the filtrate using a rotary evaporator, and additional drying was accomplished using a vacuum line. The dry material was dissolved at 30% (wt) in deionized water, and the resulting solution was acidified with concentrated HCl to a pH of 1. The imide acid produced was extracted with diethyl ether and was dried under vacuum at ambient temperature. Lithium ion exchange was carried out by dissolving the acid in THF to make a 5% (wt) solution, and the solution was stirred over lithium carbonate (4 eq) until the pH of 7 was reached (after 48 hours). The desired product was isolated by filtration to remove impurities, followed by drying of the filtrate. NMR: $^1$H (CD$_3$CN, 400 MHz)δ: 6.15 (m, 2H), 5.58 (dd, j=8.2, 4.4, 1H) ppm; $^{19}$F (CD$_3$CN, 376 MHz)δ −78.6 (s) ppm.

Salt 10. Lithium (Trifluoromethylsulfonyl)(Acrylyl) bis-Imide Polymer 4.00 g of lithium (trifluoromethylsulfonyl)acrylyl imide (Salt 9) and a small amount of CH$_3$CH$_2$OCH$_2$CH$_2$SCH$_2$CH$_2$OCH$_2$CH$_2$SH chain transfer agent were dissolved in 20 g of tetrahydrofuran (THF). The solution was degassed with N$_2$ and 35 mg of AIBN (2,2'-azobisisobutyronitrile) was added. The solution was heated to 60° C. for 19 hours to complete the polymerization. The glass transition temperature, T$_g$, of the dried glassy polymer was ca. 220° C. (DSC).

Salt 11. Sodium (Perfluorooctylsulfonyl)(Acrylyl) Imide, CH$_2$=CH—C(O)NNa(SO$_2$C$_8$F$_{17}$)

This imide was prepared using essentially the same procedure as described for making lithium (trifluoromethylsulfonyl)acrylyl imide, except that perfluorooctylsulfonamide was substituted for the trifluoromethylsulfonamide and sodium carbonate was substituted for lithium carbonate. NMR: $^1$H (CD$_3$CN, 400 MHz) 6.13 (2H, m), 6.58 (2H, dd, j=9.8, 1.5); $^{19}$F (CD$_3$CN, 376 MHz) −80.2 (3F, s), −113.0 (2F, s), −119.5 (2F, s), −121.0 (6F, m), −121.9 (2F, s), −125.2 (2F, s).

Salt 12. Lithium (1,2-Epoxyethylphenyl)trifluoromethyl bis-Sulfonyl Imide,

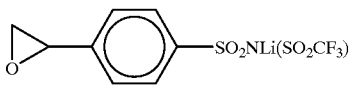

0.3 g of lithium styrenyl trifluoromethyl bis-sulfonyl imide was dissolved in 20 mL of diethyl ether, and the resulting solution was cooled to 0° C. 0.50 g of m-chloroperbenzoic acid (MCPBA) was added to the solution, and the solution was stirred for 54 hours at ambient temperature. After 54 hours, NMR analysis of an aliquot showed the reaction to be ca. ½ complete. Therefore, another 0.65 g of MCPBA was added and the reaction mixture was allowed to stir overnight. After this reaction with additional oxidizing agent, NMR analysis showed the olefin oxidation to epoxide to be complete. NMR: $^1$H (CD$_3$CN, 400 MHz)δ: 7.82 (d, 2H), 7.38 (d, 2H), 3.86 (m, 1H), 3.06 (m, 1H), 2.80 (m, 1H) ppm.

Salt 13. Ditolyl bis-Sulfonyl Imide,

This imide was made using essentially the same procedure as described for making lithium styrenyl trifluoromethyl bis-sulfonyl imide (Salt 1), by reacting toluene sulfonyl chloride with tolylsulfonamide.

Salt 14. Lithium Octyl Trifluoromethyl bis-Sulfonylimide, C$_8$H$_{17}$SO$_2$NLiSO$_2$CF$_3$ Under nitrogen, in a dried 250 mL round bottom flask, 5.8 g of trifluoromethylsulfonamide was dissolved in 40 mL of anhydrous acetonitrile to form a solution. While stirring, the solution temperature was lowered to 0° C. in an ice bath. Using a syringe, 10 g of 1-octanesulfonylchloride (available from Aldrich Chem. Co.) was added to the solution, followed by 11.9 g of triethylamine added dropwise using an addition funnel. The reaction mixture was stirred under nitrogen for 1 hour at 0° C., then for 20 hours at room temperature. The resulting triethylammonium reaction product was filtered, and then the solvent and excess triethylamine was removed from the dark yellow filtrate with a rotoevaporator. Further drying was carried out on a vacuum line.

Metathesis to the lithium salt was carried out by stirring the purified triethylammonium reaction product in 200 mL of 1M aqueous lithium hydroxide. The water was removed by vacuum and the solid lithium salt was extracted from the metathetic mixture with diethyl ether. The ether was removed by evaporation and the lithium salt was dried under vacuum. Approximately 5.7 g (45% yield) of the desired lithium octyl trifluoromethyl bis-sulfonylimide was collected.

Purification was carried out by dissolving the recovered lithium salt in 100 mL of 0.5 M LiOH and then acidifying this aqueous solution with 90 mL of 2.5 M aqueous sulfuric acid. The resulting acidic aqueous solution was washed with dichloromethane to remove organic-soluble impurities. The acidified imide was extracted from the acidic aqueous phase with diethyl ether, and then converted back to the lithium salt above by neutralization with LiOH.

Salt 15. Phenyl Fluoro bis-Sulfonyl Imide

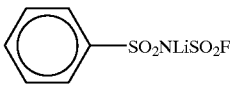

Benzene sulfonamide (16.0 g) was dissolved into 50 mL of anhydrous acetonitrile in a dry three neck round bottom flask. The flask was fitted with a dry ice condenser and put under nitrogen. The solution was cooled to 0° C. and triethylamine (30.9 g) was added dropwise. The solution was again cooled to 0° C. and sulfuryl fluoride (12.5 g) was slowly bubbled in. The reaction was allowed to proceed for approximately 8 hours at which point any unreacted or excess sulfuryl fluoride was evaporated off. The dark brown reaction product was filtered and the solvent was removed.

Conversion to the lithium salt was carried out by dissolving the reaction product in 150 mL of 1M aqueous lithium hydroxide and washing the resulting solution with dichloromethane. The water was removed by vacuum and the lithium salt was extracted with diethyl ether tetrahydrofuran (2:1 vol). Finally, the salt was stirred over dichloromethane for 24 hours, and then was filtered and dried.

Salt 16.

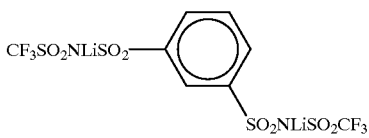

This imide was made using essentially the same procedure as described for making lithium styrenyl trifluoromethyl bis-sulfonyl imide (Salt 1), by reacting one mole of benzene 1,3-disulfonyl chloride with two moles of trifluoromethyl sulfonamide.

Evaluation of Salts in Electrolytes

Examples 1–7 and Comparative Examples C1–C3

In Examples 1–7, liquid electrolytes of this invention prepared by dissolving electrolyte salts in a variety of anhydrous solvents were evaluated for conductivity (mS/cm). Solvents used (PC=propylene carbonate; EC=ethylene carbonate; DMC=dimethyl carbonate; DME=dimethoxyethane) were all reagent grade and were dried to <30 ppm water using molecular sieves; solvent blends are all 50/50 by volume. The salts were evaluated at various molarities.

Results are presented in Table 1. Also presented are conductivities for salts known in the electrolyte art (Comparative Examples C1–C3).

TABLE 1

| Ex. | Salt | Solvent/ Blend | Molarity | Conduct. (mS/cm) |
|---|---|---|---|---|
| 1 | $C_6H_5SO_2NLiSO_2CF_3$ (Salt 3) | PC/DME | 0.7 | 5.3 |
| 2 | $F-C_6H_4SO_2NLiSO_2CF_3$ (Salt 8) | PC/DME | 0.6 | 5.8 |
| 3 | $C_6H_5SO_2NLiSO_2C_2F_5$ (Salt 5) | EC/DMC | 1.0 | 3.0 |
| 4 | $C_8H_{17}SO_2NLiSO_2CF_3$ (Salt 14) | EC/DMC | 1.0 | 2.0 |
| 5 | $C_6H_5SO_2NLiSO_2F$ (Salt 15) | EC/DMC | 1.0 | 4.2 |
| 6 | $C_{10}H_7SO_2NLiSO_2C_2F_5$ (Salt 4) | EC/DMC | 1.0 | 2.2 |
| 7 | $C_6H_4\text{-}1,3\text{-}(SO_2NLiSO_2CF_3)_2$ (Salt 16) | EC/DMC | 0.5 | 2.9 |
| C1 | $CF_3SO_2NLiSO_2CF_3$ (HQ-115) | PC/DME | 1.0 | 12.0 |
| C2 | $C_2F_5SO_2NLiSO_2C_2F_5$ (BETI) | EC/DMC | 1.0 | 7.8 |
| C3 | $H_3C-C_6H_4SO_2NLiSO_2C_6H_4-CH_3$ (Salt 13) | EC/DMC | 0.4* | 1.1 |

*Limited salt solubility in solvent(s)

The data in Table 1 show that the salts of this invention exhibit good conductivities in liquid electrolytes, though not as high as their perfluorinated analogues. However, their conductivities and solubilities are superior to the non-fluorinated ditolyl bis-sulfonylimide.

Examples 8–13 and Comparative Examples C4–C5

In Examples 8–13, liquid electrolytes of this invention prepared by dissolving electrolyte salts in a variety of anhydrous solvents were evaluated for repassivation potential (volts) against an aluminum electrode. Solvents used (PC=propylene carbonate; EC=ethylene carbonate; DMC=dimethyl carbonate; DME=dimethoxyethane) were all reagent grade and were dried to <30 ppm water using molecular sieves; solvent blends are all 50/50 by volume. The salts were evaluated at various molarities. Results are presented in Table 2.

TABLE 2

| Ex. | Salt | Solvent/ Blend | Molarity | Rep. Pot., (Volts) |
|---|---|---|---|---|
| 8 | $F-C_6H_4SO_2NLiSO_2CF_3$ (Salt 8) | EC/DMC | 1.0 | 4.0 |
| 9 | $C_6H_5SO_2NLiSO_2C_2F_5$ (Salt 5) | EC/DMC | 1.0 | 4.6 |
| 10 | $C_8H_{17}SO_2NLiSO_2CF_3$ (Salt 14) | EC/DMC | 1.0 | >5 |
| 11 | $C_6H_5SO_2NLiSO_2F$ (Salt 15) | EC/DMC | 1.0 | 3.35 |
| 12 | $C_{10}H_7SO_2NLiSO_2C_2F_5$ (Salt 4) | EC/DMC | 1.0 | 4.75 |
| 13 | $C_6H_4\text{-}1,3\text{-}(SO_2NLiCF_3)_2$ (Salt 16) | EC/DMC | 0.5 | |
| C4 | $CF_3SO_2NLiSO_2CF_3$ (HQ-115) | EC/DMC | 1.0 | 3.7 |
| C5 | $C_2F_5SO_2NLiSO_2C_2F_5$ (BETI) | EC/DMC | 1.0 | 4.4 |

The data in Table 2 show that mixed fluorochemical/hydrocarbon imide salts exhibit a slightly higher repassivation potential at the aluminum electrode than do their perfluorinated counterparts having the same perfluoroalkyl chain length, which would predict lower corrosion of aluminum current collectors.

Example 14

In Example 14, a cell was constructed which contained a polymeric electrolyte consisting of a mixture of the monomeric lithium styrenyl trifluoromethyl bis-sulfonyl imide salt (Salt 1) and polyethylene oxide (PEO), the mixture having an atomic O:Li ratio of 10:1. The polymer electrolyte physical properties and the cell electrochemical properties were determined.

To make the polymer electrolyte, 0.0227 moles of Salt 1 was dissolved in 100 mL of $CH_3CN$. To that solution was slowly added 10 g of PEO (0.227 moles, mol. wt.=900,000, available from Aldrich Chemical Co., Milwaukee, Wis.), and the resulting mixture was blended in a high speed food blender. After a homogeneous solution was obtained, the solution was coated onto a silicone release liner and dried under vacuum at 110° C. for 17 hours. A soft, rubbery material was produced which, by DSC scan, was shown to have a $T_g$ of about −23° C. and a $T_m$ of about 53° C., indicating that some PEO crystallinity remained.

The dried coating was removed from the liner and was transferred into a dry box, where a circular piece was cut out from the coating and was laminated on a stage between two circular pieces of lithium foil having an area of 5.06 $cm^2$ to form a cell. A vacuum was applied to the laminating stage at 80° C. for 2 minutes. The cell under a force of about 6 lb/$in^2$ (310 torr) was placed in a well sealed aluminum cell container, and the cell container was removed from the dry box for testing. Conductivity was determined using a PAR Model 270 potentiostat/galvanometer (available from EG&G Princeton Applied Research, Princeton, N.J.) with a Schlumberger Model 1260 frequency response analyzer (available from Schlumberger, Billerica, Mass.). The conductivity measured at room temperature was 0.01 mS/cm.

Example 15

In Example 15, the same experimental procedures were repeated as in Example 14, except that polymeric lithium styrenyl trifluoromethyl bis-sulfonyl imide salt (Salt 2) replaced the monomeric imide salt (Salt 1); again, the atomic O:Li ratio was set at 10:1. This time, a clear, rubbery material resulted which appeared to have better mechanical properties than the rubbery material of Example 14. A DSC scan of this material showed no $T_m$ due to PEO, indicating that the polymeric imide salt had completely broken up the PEO crystalline phase; a $T_g$ was measured at −5° C. Conductivity measured at room temperature was 0.002 mS/cm. Though the cation transference number ($t^+$) (i.e., the fraction of the charge carried by the cation) for this polymeric electrolyte was not measured, it is expected that $t^+$ would approach unity, due to lack of mobility of the polyanion. (For comparison, $t^+$ for HQ-115 in the same PEO was measured to be only 0.15.) While other polyelectrolytes with immobilized anions are known, none of them is believed to have such a highly dissociating anion.

Example 16

In Example 16, the same experimental procedures were repeated as in Example 15, except that a 100,000 molecular weight PEO (available from Aldrich Chemical Co.) was used in place of the 900,000 molecular weight PEO; again, the atomic O:Li ratio was set at 10:1. Conductivity measured at 30° C. was 0.002 mS/cm.

Example 17

In Example 17, the same experimental procedures were repeated as in Example 16, except that lithium phenyl trifluoromethyl bis-sulfonyl imide (Salt 3) was used instead of polymeric lithium styrenyl trifluoromethyl bis-sulfonyl imide salt (Salt 2); again, the atomic O:Li ratio was set at 10:1. A DSC scan of this material showed a $T_g$ at $-25°$ C. and a $T_m$ at $54°$ C. Measured conductivity was 0.031 mS/cm at $30°$ C.

Example 18

In Example 18, the same experimental procedures were repeated as in Example 15, except that a non-crystalline ethylene oxide/methylene oxide copolymer (41,000 mol. wt.) prepared by following the procedure described in J. R. Craven et al., Makramol. Chem. Rapid Commun., 7 (1986), 81, was used in place of the PEO; again, the atomic O:Li ratio was set at 10:1. Measured conductivity was 0.0086 mS/cm at $30°$ C.

Example 19

In Example 19, a cell was constructed which contained a polymeric electrolyte consisting of a mixture of polymeric lithium trifluoromethylsulfonyl acrylyl bis-imide salt (Salt 10) and polyethylene oxide (PEO) (900,000 mol. wt., available from Aldrich Chemical Co.), the mixture having an atomic O:Li ratio of 15:1. The polymer electrolyte physical properties and the cell electrical properties were determined.

To make the polymer electrolyte, 0.619 g of the Salt 10 solution (16.7% (wt) in THF—see Salt 10 preparation) was mixed with 3.128 g of a 10% (wt) solution of PEO (mol. wt.=900,000, available from Aldrich Chemical Co.) in $CH_3CN$. A small amount of the resulting mixture was placed on a piece of 5 mil (0.13 mm) thick aluminum foil, and the coated foil was dried at $80°$ C. under vacuum. The dried polymer electrolyte coating was a clear, rubbery which appeared to have better mechanical properties than the rubbery material of Example 14. A DSC scan of the removed coating showed a $T_m$ at $66°$ C. due to PEO, indicating that the polymeric imide salt had not completely broken up the PEO crystalline phase; a $T_g$ was measured at $-42°$ C.

The coating was then placed in a press with the platens heated to $90°$ C. and pressed to give a clear electrolyte film about 1.5 mils (0.04 mm) thick. The film was dried at $110°$ C. under vacuum for 17 hours and then transferred to a dry box. A stainless steel electrode was placed on the surface of the electrolyte film, and this assembly was placed into a well sealed aluminum cell container (5 cm×6 cm rectangular) under a force of about 6 lb/in² (310 torr). The cell container was then removed from the dry box, and was tested for conductivity using a PAR Model 270 potentiostat/galvanometer with a Schlumberger Model 1260 frequency response analyzer. Measured conductivities were 0.00067 mS/cm at room temperature and 0.01 mS/cm at $60°$ C.

Example 20

In Example 20, the same experimental procedures were repeated as in Example 19, except that a non-crystalline ethylene oxide/methylene oxide copolymer (41,000 mol. wt., prepared as previously described in Example 18) was used in place of the PEO; again, the atomic O:Li ratio was set at 10:1. A DSC scan of this polymer electrolyte coating showed a $T_g$ at $-43°$ C. and no $T_m$. Measured conductivities were 0.002 mS/cm at $25°$ C. and 0.031 mS/cm at $60°$ C.

Example 21

In Example 21, a gel electrolyte was prepared by mixing polymeric lithium styrenyl trifluoromethyl bis-sulfonyl imide salt (Salt 2) at a 1:1 weight ratio with propylene carbonate. A DSC scan of this polymer electrolyte showed a $T_g$ at $-75.8°$ C. The cell was constructed as described in Example 13. Conductivity measured at $30°$ C. was 0.128 mS/cm.

Example 22

In Example 22, a gel electrolyte was prepared by mixing a blend of polymeric lithium styrenyl trifluoromethyl bis-sulfonyl imide salt (Salt 2), an ethylene oxide/propylene oxide copolymer (5:1 EO/PO by unit (or mole), mol. wt.=1100, available from Polysciences, Inc.), and propylene carbonate at a weight ratio of 1.25/1.64/3.50. A DSC scan of this polymer electrolyte showed a $T_g$ at $-64°$ C. The cell was constructed as described in Example 13. Conductivity measured at $26°$ C. was 0.60 mS/cm.

We claim:

1. A battery electrolyte comprising:

(a) an imide salt of the formulae

(I)

(II)

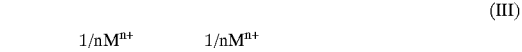

or (III)

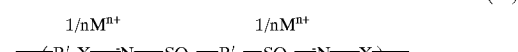

(IV)

wherein: X is $SO_2$ or $C(O)$;

$R_f$ is a fluorine atom, a straight or branched acyclic perfluoroalkyl group having from 1 to 12 carbon atoms or a cyclic perfluoroalkyl group having from 3 to 12 carbon atoms in which the perfluoroalkyl group is uninterrupted or interrupted by a catenary heteroatom;

$R'_f$ is a straight or branched perfluoroalkylene group having from 1 to 12 carbon atoms, which may contain a cyclic moiety and which is uninterrupted or interrupted by a catenary heteroatom;

$R_h$ is selected from the group consisting of a straight or branched aliphatic group having from 2 to 18 carbon atoms and interrupted by a catenary heteroatom, a straight or branched aliphatic or cycloaliphatic group having from 4 to 18 carbon atoms, a substituted or unsubstituted aromatic group, and a reactive group;

$R'_h$ is a divalent organic group;

$M^{n+}$ is a cation having a valence of n; and (b) a matrix material.

2. The electrolyte of claim 1, wherein M is a metal cation, an ammonium cation or a proton.

3. The electrolyte of claim 1, wherein $R_f$ is a straight or branched acyclic perfluoroalkyl group having 1 to 8 carbon atoms in which the perfluoroalkyl group is uninterrupted or interrupted by a catenary heteroatom selected from nitrogen, oxygen and sulfur.

4. The electrolyte of claim 1 wherein $R_f$ is $CF_3-$, $C_2F_5-$, $C_4F_9-$, $C_8F_{17}-$, $(CF_3)_2NC_2F_4-$, $CF_3OC_2F_4-$,

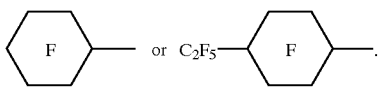

5. The electrolyte of claim 1, wherein $R'_f$ is $-CF_2CF_2-$, $-(CF_2)_4-$, $-CF_2CF(CF_3)-$, or

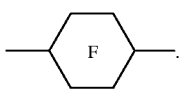

6. The electrolyte of claim 1, wherein $R_h$ is a straight or branched aliphatic grouping having 2 to 8 carbon atoms interrupted by a heteroatom selected from the group consisting of nitrogen, oxygen and sulfur.

7. The electrolyte of claim 1, wherein $R_h$ is $C_4H_9-$, $C_6H_{13}-$, $C_8H_{17}-$ or

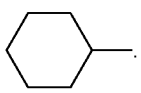

8. The electrolyte of claim 1, wherein $R_h$ is $CH_3OCH_2CH_2-$, $CH_3OCH_2CH_2OCH_2CH_2-$ or $(CH_3)_2NCH_2CH_2-$.

9. The electrolyte of claim 1, wherein $R_h$ is phenyl, or a phenyl substituted by alkyl of 1 to 4 carbon atoms, halo, nitro, trifluoromethyl or cyano.

10. The electrolyte of claim 1, wherein $R_h$ is a reactive group which is a polymerizable group.

11. The electrolyte of claim 10, wherein the polymerizable group is an olefinic unsaturated group, an epoxide, an azetidine group or an aziridine group.

12. The electrolyte of claim 11, wherein the olefinic unsaturated group is selected from the group consisting of vinyl, allyl, vinylbenzyl, acryloyl, and methacryloyl.

13. The electrolyte of claim 1, wherein $R_h$ is a reactive group which is an alcohol, amine, isocyanate or di- or trialkoxysilyl group.

14. The electrolyte of claim 1, wherein $R'_h$ is an alkylene, cycloalkylalkylene, arylene or aralkylene group.

15. The electrolyte of claim 1, wherein $R'_h$, is

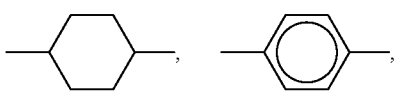

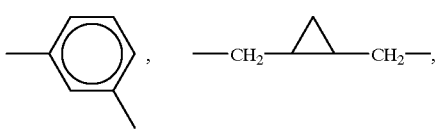

-continued

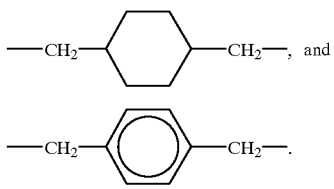

16. The electrolyte of claim 1 comprising a polymeric salt of the formula:

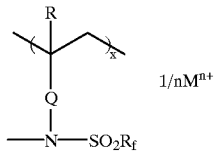

(VI)

wherein:
x indicates a repeating unit;
Q is $-C_6H_4SO_2-$ or $-C(O)-$; and
R is hydrogen or a methyl, ethyl, propyl or butyl group.

17. The electrolyte of claim 1 comprising a salt of the formula

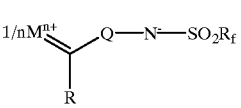

(VII)

wherein:
Q is $-C_6H_4SO_2-$ or $-C(O)-$, and
R is hydrogen or a methyl, ethyl, propyl or butyl group.

18. The electrolyte of claim 1 which further comprises a conductive salt.

19. The electrolyte of claim 1, wherein the total salt concentration in the matrix material is from about 0.1M to about 2.0M.

20. A battery electrolyte comprising:
(a) a methide salt of the formula

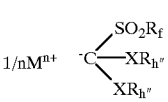

(V)

wherein:
X is $SO_2$ or $C(O)$;
$R_f$ is a fluorine atom, a straight or branched acyclic perfluoroalkyl group having from 1 to 12 carbon atoms or a cyclic perfluoroalkyl group having from 3 to 12 carbon atoms in which the perfluoroalkyl group is uninterrupted or interrupted by a catenary heteroatom;
$R_h"$ is the same or different and is a straight or branched aliphatic group having 1 to 18 carbon atoms, a cycloaliphatic group of 3 to 12 carbon atoms in which the carbon chain of the aliphatic or cycloaliphatic groups is uninterrupted or interrupted by a catenary heteroatom; a substituted or unsubstituted aromatic or aromatic alkyl group, in which alkyl has 1 to 4 carbon atoms; a reactive group, or when taken together $R_{h''}$ is an alkylene group of 2 or 3 carbon atoms or a phenylene group joined to the X group at the 1,2 or 1,3 positions of the phenylene group;

$M^{n+}$ is a cation having a valence of n; and (b) a matrix material.

21. The electrolyte of claim 20, wherein M is a metal cation, an ammonium cation or a proton.

22. The electrolyte of claim 20, wherein $R_f$ is a straight or branched acyclic perfluoroalkyl having 1 to 8 carbon atoms in which the perfluoroalkyl group is uninterrupted or interrupted by a catenary heteroatom selected from nitrogen, oxygen and sulfur.

23. The electrolyte of claim 20, wherein $R_f$ is $CF_3$—, $C_2F_5$—, $C_4F_9$—, $C_8F_{17}$—, $(CF_3)_2NC_2F_4$—, $CF_3OC_2F_4$—, or

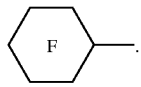

24. The electrolyte of claim 20, wherein $R_{h''}$ is $C_4H_9$—, $C_6H_{13}$—, or $C_8H_{17}$—.

25. The electrolyte of claim 20, wherein $R_{h''}$ is $CH_3OCH_2CH_2$—, $CH_3OCH_2CH_2OCH_2CH_2$— or $(CH_3)_2NCH_2CH_2$—.

26. The electrolyte of claim 18, wherein $R_{h''}$ is phenyl and X is $SO_2$.

27. The electrolyte of claim 26, the imide salt having an anion of the formula

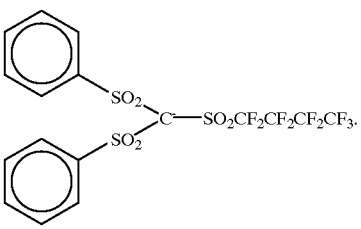

28. The electrolyte of claim 20, the imide salt having an anion of the formula

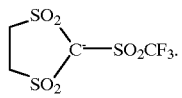

29. The electrolyte of claim 20, which further comprises a conventional conductive salt.

30. The electrolyte of claim 20, wherein the total salt concentration in the matrix material is from about 0.1M to about 2.0M.

31. A battery comprising:
   at least one cathode;
   at least one anode; and
   the electrolyte according to claim 1.

32. A battery comprising:
   at least one cathode;
   at least one anode; and
   the electrolyte according to claim 20.

* * * * *

UNITED STATES PATENT AND TRADEMARK OFFICE
CERTIFICATE OF CORRECTION

PATENT NO.    : 6,063,522
DATED         : May 16, 2000
INVENTOR(S)   : Steven J. Hamrock and Phat T. Pham It is certified that error appears in the above-identified patent and that said Letters Patent is hereby corrected as shown below:

Column 12,
Line 23, "$R'_{f1}$" should read -- $R'_{f2}$ --

Column 18,
Line 42, "ofthe" should read -- of the --

Column 24,
Line 41, delete "fluorine atom"

Column 26,
Line 56, delete "fluorine atom"

Column 28,
Line 21, delete "conventional"

Signed and Sealed this

Third Day of December, 2002

JAMES E. ROGAN
*Director of the United States Patent and Trademark Office*